United States Patent

[11] 3,608,028

| [72] | Inventor | Andre Paymal<br>Clermont, France |
|---|---|---|
| [21] | Appl. No. | 679,412 |
| [22] | Filed | Oct. 31, 1967 |
| [45] | Patented | Sept. 21, 1971 |
| [73] | Assignee | Compagnie de Saint-Gobain<br>Neuilly sur Seine, France |
| [32] | Priority | Nov. 3, 1966 |
| [33] | | France |
| [31] | | 82,331 |

[54] METHOD OF MAKING SINTERED AND COMPRISED THERMOPLASTIC PEARLS
6 Claims, 4 Drawing Figs.

[52] U.S. Cl.................................................. 264/112,
264/119, 264/126, 264/129
[51] Int. Cl..................................................... B32b 5/28,
B29d 27/08

[50] Field of Search............................................ 117/138,
138.8, 169; 161/160, 161, 162, 247, 168, 208,
166; 260/2.5 B, 2.5 AK; 264/41, 46, 112, 113,
123, 126, 125, 234, 321

[56] References Cited
UNITED STATES PATENTS
3,104,196  9/1963  Shannon....................... 117/138.8
FOREIGN PATENTS
1,030,333  5/1966  Great Britain................  161/161

*Primary Examiner*—William J. Van Balen
*Attorneys*—Dale A. Bauer, John L. Seymour and Bauer and Seymour ABSTRACT: Strong structural materials of good insulating and fireproofing value are made from compressed polystyrene pearls and interstitial, hardened cementitious material.

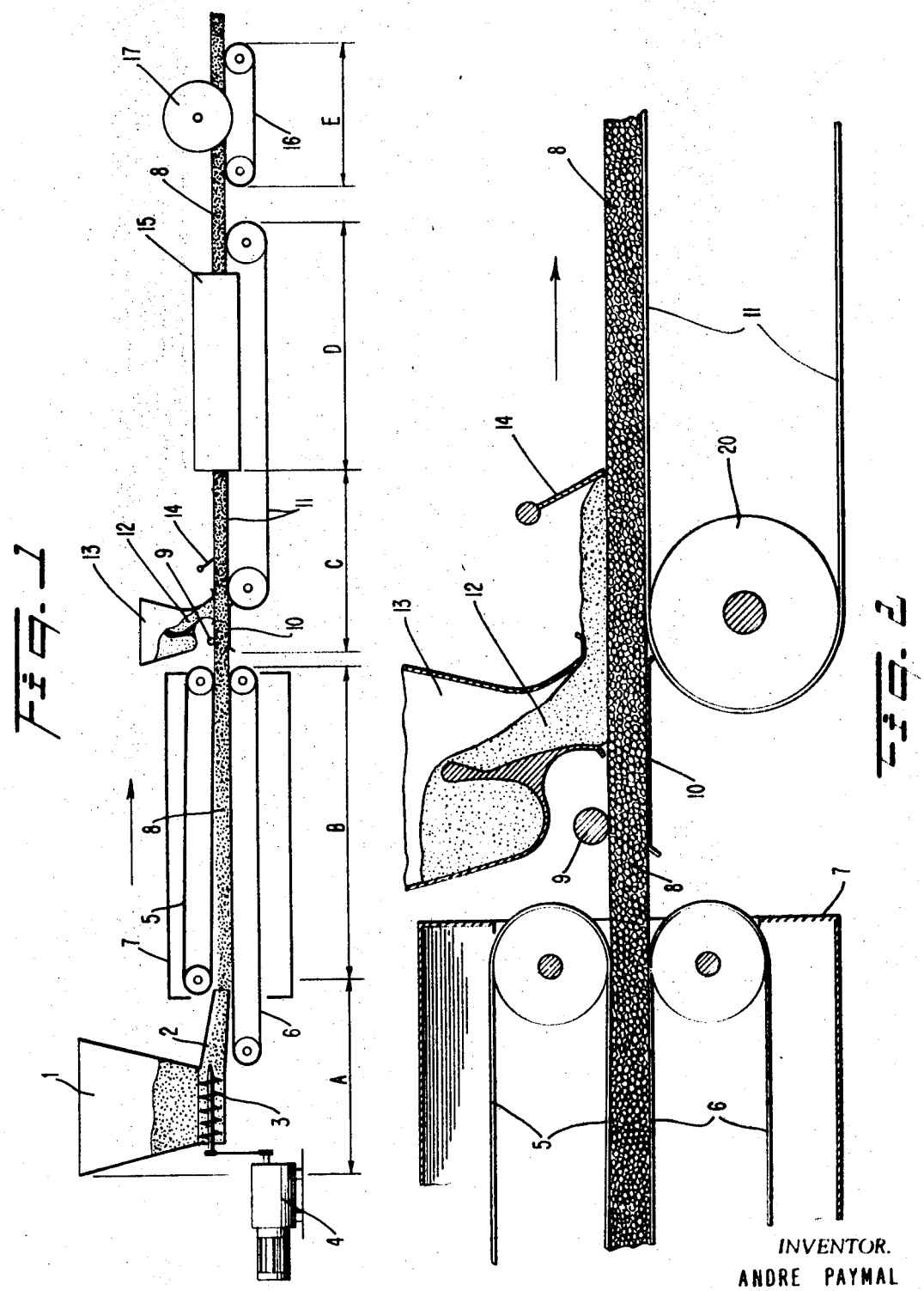

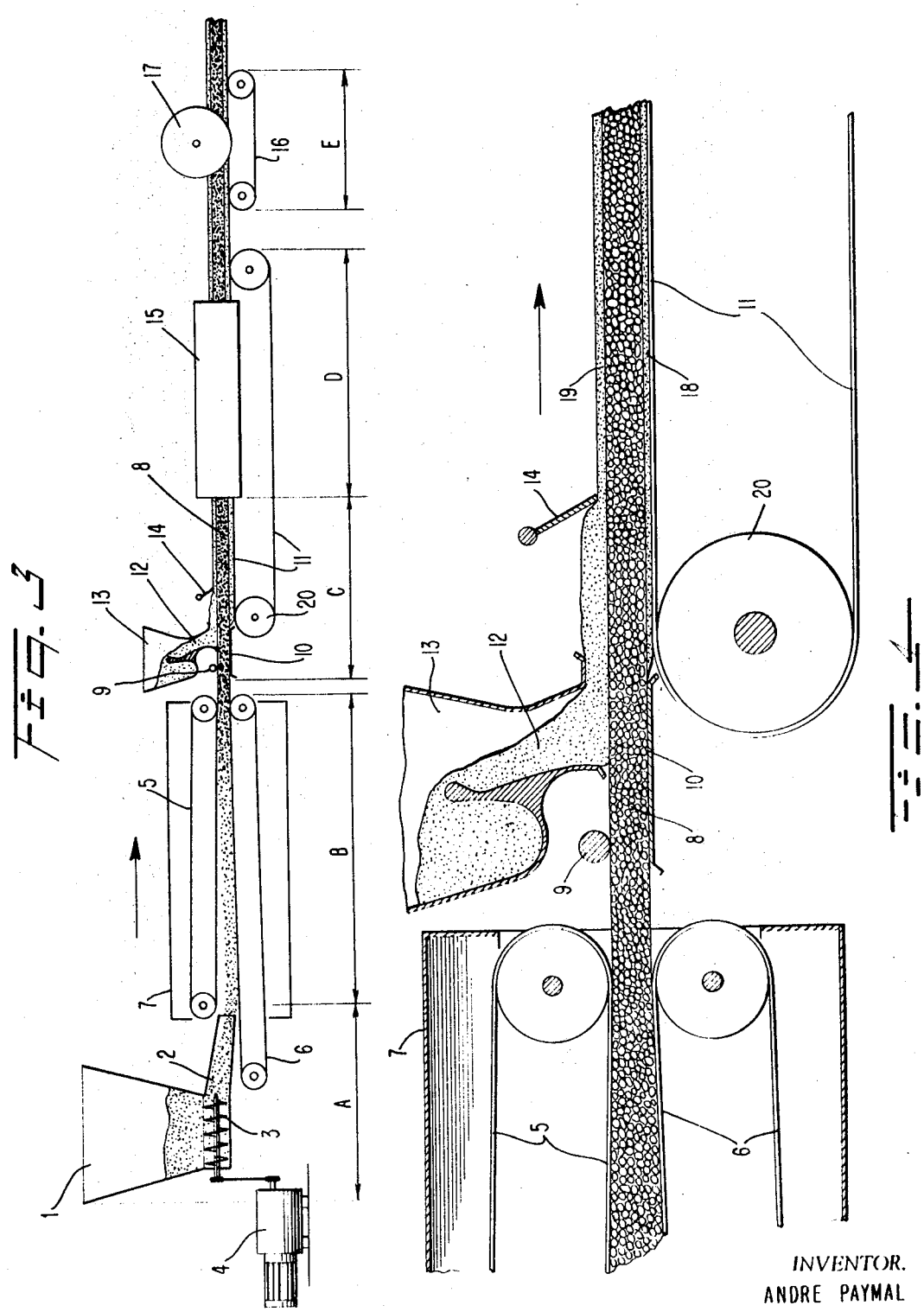

METHOD OF MAKING SINTERED AND COMPRISED THERMOPLASTIC PEARLS

This invention relates to new building materials such as wallboard, soundproofing panels, and fire-resisting panels which have heretofore been made from plaster or cement mixed with light insulating material either fibrous or nodular. The prior materials of that type did not contain high proportions of the light insulating materials, and tended to lose strength as those proportions were increased.

It is an object of this invention to make light building and structural materials having higher proportions of insulating material to cementitious material than was previously feasible.

According to this invention expanded thermoplastic pearls, cellular in nature, are heated to plasticity, put under compression sufficient to cause cohesion of contiguous faces of the pearls while maintaining interstices between them, impregnating these interstices with cementitious material in a state sufficiently fluid to penetrate the interstices. Aqueous sludges of cementitious material such as plaster, cement, concrete, and lime may be used, thinned with water to flow readily into the pores between the cells. After impregnation is completed the cementitious material hardens in place if allowed to rest, but the process may be speeded by incorporating accelerators or flocculating agents in the mix.

The pearls may ideally be such as are produced by the processes of French patents 1,440,075; 1,440,076; and 1,440,106, wherein the production of expanded polystyrene pearls is described. In one of those patents the polystyrene pearls contain residual expansion agent, and are treated with hot air at 90–100° C., then with steam, to produce substantially full expansion. In another of the patents the pearls, containing expansion agent are expanded first by steam in the air, and then by steam in an autoclave.

In the present invention the pearls of expanded polystyrene are reheated to about 110° C., under light pressure, which suffices to join the surfaces of contiguous pearls to each other. The pressure is kept so low that the interstices between the pearls are not wholly blocked, otherwise it has no critical limits. The heating can be carried out by circulating hot air through the interstices, as described in French patent 1,440,106.

The compression of the pearls to form wallboard may be accomplished by passing the pearls between two belt conveyors of which the inner courses progressively approach each other downstream. The pitch of the courses can be altered to press the pearls against each other with force sufficient to produce good cohesion without closing the passages internally or at the surface. If the degree of compression is between about 10 percent and about 50 percent, this is achieved, 10 percent compression meaning a 10 percent reduction in volume. The volume of the passages is also reduced as pressure is increased so that the proportion of cementitious to cellular material can be made to vary substantially by choosing different pressures, which are obtained by changing the angle between the courses.

By agglomerating pearls of expanded polystyrene at different pressures the percentage of open passages between pearls may be changed from about 5 percent through about 45 percent of the volume of the finished structural material, thus changing the density of the product and varying its thermal and mechanical properties, it becoming stronger with density and better insulation as the size of the passages and cells increase.

As an example, pearls of polystyrene made according to one of the cited French patents had a density of about 4 kg./m.³. The expanded pearls were compressed as in FIGS. 1 and 2 at a temperature of about 110° C. to a density of 5.5 kg./m.³ and agglomerated, producing a board with about 16 percent open passages. The passages were impregnated with liquid plaster with the consistency of a loose slip, by the method shown in FIG. 2, and the resulting board was hardened and cooled, producing a product of 190 kg./m.³. The slip penetrated throughout the open passages bordering the pearls. Such slips may also contain adjuvants affecting viscosity, surface tension, and the speed of setting of the cementitious material. Foams and froths of cementitious material may also be used when they will flow, producing a cellular type of interstitial cement. While the inorganic cementitious materials are preferred for many uses because of low cost and ease of handling it is possible to use an organic filler such as the thermohardening resins like the polyesters and phenolics.

The hardening of the filler can proceed at atmospheric temperature and pressure, as in the case of the usual cements, or hardening can be accelerated by heat or hardeners. After setting the inorganic filler will not yet be dry but it may be stored in a ventilated dry place, without special precautions, to complete the drying progressively.

The new materials are light, strong, and fire-resistant when polystyrene is used. Their internal structure offers organic braces extending from face to face throughout the thickness of the piece, each compressed pearl being braced by those contiguous to it, and rigid cement extending throughout the interstices completes the solidity of the structure, which is quite different from anything which can be produced by merely mixing and drying the same ingredients. Further, such mixtures had to be molded to a shape whereas the new product has its original dimensions after impregnation except when an excess of filler is hardened on the surface. Because of this, the present invention permits continuous manufacture.

In one form of the invention the cement, after penetrating the pearly body of the sheet, is extended over one or all its faces, thus being integral with the strands which pass between the pearls of expanded and compressed thermoplastic. The strength of such bodies is relatively great, especially when the opposite broad faces are thus interconnected by a network of integral braces extending through the interstices between the pearls, which are themselves integrally united. Such bodies have a great moment of inertia against flexing, excellent shock resistance, and excellent resistance to penetration.

It is also a part of the invention to include, especially in the surface layers, some fibers, ribbons, or other strengthening materials, for instance textile fibers, asbestos fibers, muslin strips, tissues, and felts. In such cases the ribbons can be applied over the edges with advantage to protect the corners of the sheet. It is often advantageous to sink the ribbon into the face adjacent the corner to present a smooth surface. When cement is used metallic reinforcement such as wire mesh or wires may be embedded in the surface layers. In the drawings:

FIG. 1 is a diagrammatic elevation of novel apparatus for making the novel products and executing the novel process;

FIG. 2 is an enlarged detail of some of the apparatus of FIG. 1;

FIG. 3 is a diagrammatic elevation of novel apparatus modified to apply layers of cementitious material to the opposite broad faces of the product; and FIG. 4 is an enlarged detail of a part of FIG. 3.

As expanded pearls of polystyrene are the preferred thermoplastic material this description will be of making such a product from them. Reference is to FIGS. 1 and 2.

A hopper 1 receives expanded pearls of polystyrene in a loose mass and a conveyor 3, driven by motor 4 forces them through shaping tunnel 2 which imparts incipient sheet form without compressing them. The sheet 8 issues from the tunnel between the inner courses of carrier belts 5, 6, which are more widely spaced upstream than downstream. Suitable apparatus, not shown, permits the angle between the courses to be changed. Baffles beside the belts prevent lateral escape of the charge. An oven 7, suitably heated to the self-welding or fusing temperature of the pearls encloses the operative parts of the belts, between which the pearls are compressed. The pearls are compressed to a degree which leaves interstices between the pearls opening at the surfaces, and are heated until each pearl coheres to those in contact with it. The angle of the courses and temperature will be chosen by test to produce that proportion of interstitial passages and that degree of agglomeration which is desired, considering the thickness of the sheet, the size of the pearls, and the thermoplast in use. Examination of the cross section of the product, under magnification, during the first stages of a run, with appropriate adjustment of the angle of the courses and the temperature of the oven, suffice to produce the requisite temperature and pressure and the desired product. The figures heretofore given suffice for an average operation using polystyrene pearls. The oven may be heated by hot air, which may be still or may be flowed through the sheet. The plastic sheet will be composed of coherent pearls between which are interstices of sizes proportional to the pressure exerted by the belts and the sizes of the pearls.

The sheet 8, thus formed, leaves the oven, passes between roller 9 and plate 10, retaining its size, and goes under hopper 13 which flows over its surface fluid plaster 12 which passes downward filling the open interstices. A scraper 14 cleans the upper surface of the sheet and limits the downstream flow of plaster. The impregnated band 8 is picked up by conveyor 11 and carried into a hot tunnel 15 wherein the plaster is hardened and further cohesion may take place between the pearls. After leaving the tunnel the sheet 8 passes to a cutter 17 of any suitable sort.

The apparatus thus has five stages indicated by letters: Feeding and sheet forming zone A; hot zone of cohesion B; impregnating zone C; drying and setting zone D for setting the impregnant; and cutting zone E. As residual moisture may be, and usually is, present after zone D, although the piece is already strong, cementitious materials are strengthened by resting and drying out and a sixth, curing zone, may well follow zone E.

In FIGS. 3 and 4 zone C is modified by spacing roller 20 and its belt 11, which support the sheet during impregnation, below the level of the sheet, providing a gap into which a layer of plaster 18 flows through the open pores in the sheet. The scraper 14 is set above the level of the sheet to permit a layer of plaster 19 to form above the sheet, both layers being integral with the vertically and horizontally extending network of plaster which is within the body of the sheet, filling the interstices.

The preferred product is composed of coherent pearls of cellular polystyrene under internal pressure and a network of set cementitious material extending through pores, passages, and channels between the pearls to the surface. It may be considered as a porous block of coherent polystrene pearls impregnated with some form of cement. A major difference between this product and those known to the prior art, in which thermoplast particles were mixed with plaster, shaped and dried, is that a regular pattern of channels, filled with cement, exists between cells which were joined in advance to form a block, the conjoined walls of which are free of the other phase. The cementitious material used for impregnation can be an aqueous sludge of plaster constituted by a mixture of 2/3 of calcium semihydrate and 1/3 of calcium anhydrite. The presence of calcium anhydrite is advantageous as this material is slowly hydrated and the crystallization which results follows the crystallization of the semihydrate. This complementary crystallization increases coherence of bihydrated calcium sulfate formed from the semihydrate and increases the mechanical resistance of the product. Furthermore, the presence of calcium anhydrite lessens the shrinkage of plaster.

A satisfactory aqueous sludge can be obtained with the following proportions:

| Plaster | 100. |
|---|---|
| Water | 80. |

It is well known that when the proportion of water is lessened, mechanical resistance of the material is improved. In order to maintain, however the fluidity of the sludge, it is advantageous to introduce amine salts such as decylamine, dodecylamine, hexadecylamine, octodecylamine alkylarylsulfonates, chlorhydrates or acetates (0.1 percent to 1 percent in weight of the plaster) or residual sulphitic solutions of cellulose (0.05 percent) or potassium citrate. (10.05 percent).

The following composition can be used:

| Plaster | 100. |
|---|---|
| Water | 50. |
| Potassium citrate | 0.05 |

It is important to reduce as much as possible the time of setting as it permits to reduce the length of the part of the device corresponding to continuous molding of the products. A proportion of 1 percent to 2 percent of pulverized gypsum can be added to the plaster for this purpose. It is also possible to use chlorides or sulfates of monovalent and trivalent metals such as sodium chloride, aluminum chloride and potassium sulfate.

The following composition can be used:

| Plaster | 100. |
|---|---|
| Sodium chloride | 2. |
| Dodecylamine | 0.5 |
| Water | 40. |

In order to obtain simultaneously a short time of setting and a high mechanical resistance it is advantageous to use a plaster containing essentially alphasemihydrate.

The composition can be the following:

| Semihydrate-alpha | 100. |
|---|---|
| Lime | 5. |
| Soda—36% | 2. |
| Water | 50. |

The time of setting is about 4 to 5 minutes.
A mixture of plaster and cement can be used.
The following composition is advantageous:

| Plaster | 100. |
|---|---|
| Portland cement | 10. |
| Sand | 20. |
| Aluminum chloride | 2. |
| Octodecylamine | 0.5 |
| Water | 60. |

The reheating of pearls, during the autogeneous welding, is preferably effected with hot air at a temperature comprised between 100° C. and 140° C. when using polystyrene pearls having a softening point of about 115° C.

The temperature of this air permits the reheating of the surface of the pearls at the temperature corresponding to the beginning of the softening of the material which is also the suitable temperature for sticking the pearls together.

If the time for the reheating is very short, for example 2 to 10 seconds, the temperature of the air will be comprised between 115 and 140° C.

If the time for this reheating is longer, for example 10 to 100 seconds, the temperature of the air will be comprised between 105 and 120°.

The impregnation of the sheet of pearls can be done by pouring the sludge on the upper part of the sheet. It can also be done by bringing the sludge, under light pressure, to the lower part of the sheet.

The sludge can advantageously be maintained in a feeding receptacle heated at a temperature of about 80° C., the setting being effected after cooling at 40° C.

The setting of the sludge is effected on the conveyor on which the impregnated material is received.

When using plaster, the time for setting is comprised between 3 and 20 minutes.

When using cements, the time for setting is longer and reaches 4 hours about for Portland cement with natural drying, 3 hours for a drying in an atmosphere of water vapor at 80° C. and 1/2 to 2 hours when introducing in the dry cement an accelerator such as calcium chloride (1.5 percent to 0.2 percent).

As many apparently widely different embodiments of the present invention may be made without departing from the spirit and scope thereof, it is to be understood that the invention is not limited to the specific embodiments.

What is claimed is:

1. A method of making insulating, structural material which comprises heating loose pearls of expanded thermoplastic resin to a temperature at which the walls of the loose pearls are plastic and at which the walls will cohere, compressing the expanded pearls while so heated to reduce the volume by from 10 percent to 50 percent and to cause the walls to cohere, said compression being to a degree which leaves at least about 5 percent open pores between the pearls, filling the pores between the pearls throughout the thickness of the material with a fluid cementitious material and hardening the cementitious material within the pores to form a rigid continuous network throughout the thickness of the material of the hardened cementitious material.

2. A method according to claim 1 in which the compression leaves from about 5 percent to about 45 percent open pores and the said temperature to which the pearls are heated is circa 110° C.

3. A method according to claim 1 which comprises heating expanded polystyrene pearls having a density circa 4 kg./m.$^3$ and compressing to leave about 16 percent open pores between the pearls, and in which the cementitious material is fluid plaster.

4. A method according to claim 1 in which an excess of the filler is spread over and dried on the surface of the structural material, forming a coat integral with the filler in the passages.

5. A method of making an insulating, structural material which comprises heating loose pearls of an expanded thermoplastic resin to a temperature at which the walls of the pearls are plastic and at which the walls will cohere, molding the loose pearls into a panel having substantially the thickness of the desired structural material, said molding including compressing the expanded thermoplastic pearls at said temperature at which the walls cohere, the compression being limited to a degree which leaves at least about 5 percent open pores between the pearls, filling the pores throughout the thickness of the panel with a fluid cementitious material and hardening the cementitious material within the pores to form a structural material formed of thermoplastic pearls having cohered walls of said resin and an enclosed separate continuous network of the hardened cementitious material.

6. A method of forming building sheet continuously which comprises feeding a continuous stream of expanded polystyrene pearls in sheet form progressively, heating the pearls to a temperature at which the walls of the pearls are plastic and will cohere, compressing the polystyrene pearls in the sheet to substantially the final thickness of the sheet, while leaving open passages throughout the entire thickness of the sheet, said passages being interconnected and constituting at least 5 percent by volume of the volume of the sheet, impregnating the open passages with a fluid, cementitious material, and hardening the fluid cementitious material within the sheet.

UNITED STATES PATENT OFFICE
CERTIFICATE OF CORRECTION

Patent No. 3,608,028        Dated September 21, 1971

Inventor(s) Andre Paymal

It is certified that error appears in the above-identified patent and that said Letters Patent are hereby corrected as shown below:

On the Title Page, line 2 of "[54]" change "COMPRISED" to -- COMPRESSED --. Column 1, line 1, change "COMPRISED" to -- COMPRESSED --.

Signed and sealed this 29th day of February 1972.

(SEAL)
Attest:

EDWARD M. FLETCHER, JR.         ROBERT GOTTSCHALK
Attesting Officer        Commissioner of Patents